(No Model.)

J. J. KOCH & W. P. GRATH.
COTTON SEED LINTER.

No. 321,824. Patented July 7, 1885.

Attest:
Geo. L. Wheelock
Victor A. Lewis

Inventors:
Julius J. Koch
Walter P. Grath
By Knight Bro.
Attys

UNITED STATES PATENT OFFICE.

JULIUS J. KOCH AND WALTER P. GRATH, OF ST. LOUIS, MISSOURI.

COTTON-SEED LINTER.

SPECIFICATION forming part of Letters Patent No. 321,824, dated July 7, 1885.

Application filed March 9, 1885. (No model.)

*To all whom it may concern:*

Be it known that we, JULIUS J. KOCH and WALTER P. GRATH, both of the city of St. Louis and State of Missouri, have invented certain new and useful Improvements in Cotton-Seed Linters, of which the following is a full, clear, and exact description, reference being had to the accompanying drawings, forming part of this specification.

Figure 1:
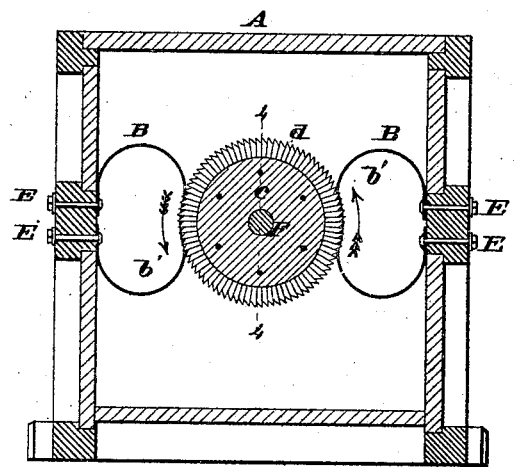
Figure 2:
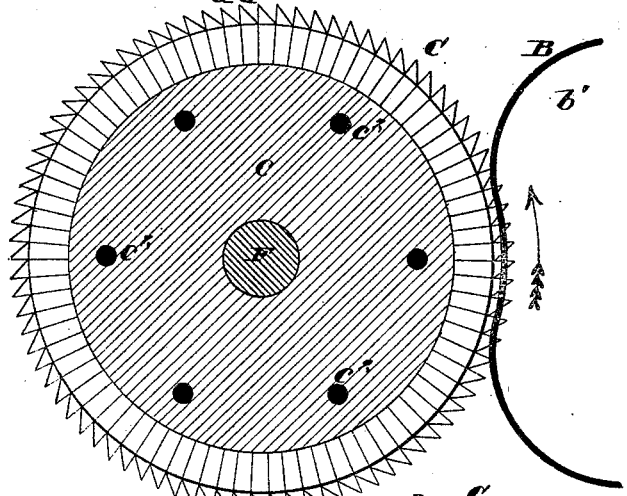
Figure 3:
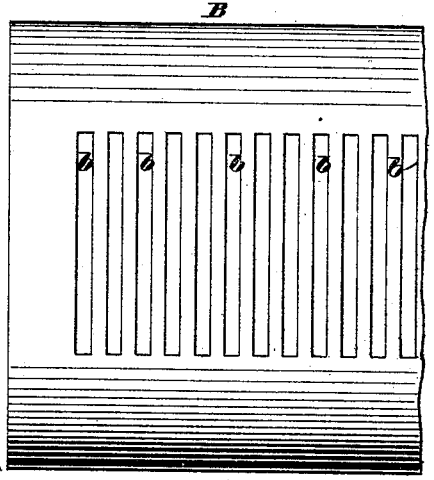
Figures 4, 5, 6, 7, 8:
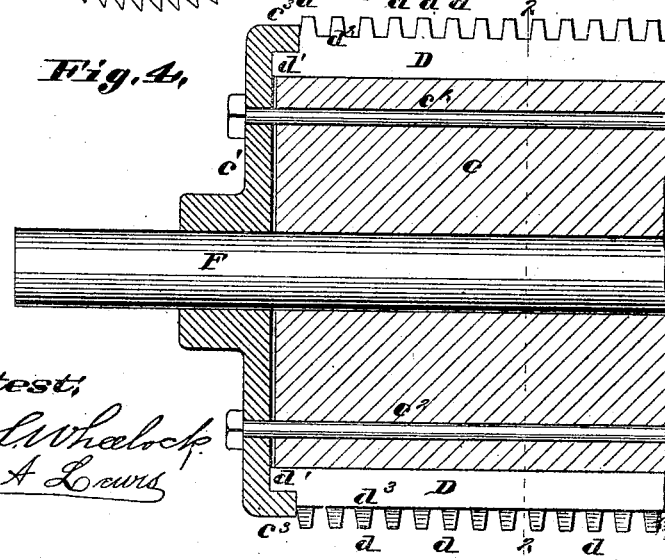

Figure 1 is a transverse section through the machine. Fig. 2 is an enlarged detail section of the toothed cylinder at 2 2, Fig. 4, part of a basket being also shown. Fig. 3 is a front view of one of the slotted baskets which contain the cotton-seed. Fig. 4 is an enlarged detail section at 4 4, Fig. 1. Figs. 5, 6, and 7 are detail front views, showing portions of toothed ribs with teeth of different constructions. Fig. 8 is a section at 8 8, Fig. 5.

A is a box which receives the lint which is scraped from the seeds within the baskets B, and carried out by the teeth of the cylinder C. The baskets are made of sheet metal, preferably bent into the form shown, so that as the mass of cotton-seed is engaged by the teeth $d$, which work through the slots $b$ of the baskets, the mass may be caused to revolve in the baskets, thus presenting fresh portions to the teeth, the rounded shape of the baskets at $b'$ conducing to the rolling of the mass. The baskets are secured to the sides of the box A by screw-bolts E, and each is formed on its side, contiguous to the cylinder, with a concavity which is preferably concentric with the said cylinder.

The toothed cylinder C is constructed as follows: $c$ is a cylinder, which may be of wood, and through which passes axially a shaft, F, upon which is fixed a drive pulley or wheel. (Not shown.) The cylinder has at its ends two similar heads, $c'$, which are secured to the shaft F by keys or otherwise, and which are connected together and to the core-cylinder $c$ by long bolts $c^2$. The heads $c'$ have marginal inturned flanges $c^3$, between which and the circumference of the core-cylinder are annular recesses. In these annular recesses, at the ends of the cylinder fit the lugs $d'$ of an annular series of serrated strips, D, that form the surface of the cylinder between the two flanges $c^3$. The teeth $d$ of the strips of metal D, have one side, $d^2$, in the plane with the front side of the strip, and the rear sides, $d^3$, of the teeth are beveled, so that the teeth have a chisel-edge that may be a plain edge, as shown in Figs. 4 and 5, serrated, as in Fig. 6, or corrugated, as in Fig. 7. The sides $d^4$ of the teeth may be at right angles to the strip D, or may have an equal bevel, as shown in Figs. 4 and 7, or one side, $d^4$, may be perpendicular and the other beveled, as shown in Figs. 5 and 6. The tooth-strips D are so shaped that their sides fit tightly together, so as to form practically a solid layer, as seen in Fig. 2, the strips being firmly held in position by the flanges $c^3$ of the heads.

In working the machine the cotton-seed is fed into one end of the baskets and the linted cotton-seed escapes from the other end of the baskets, the lint being scraped from the seeds and carried through the slots into the lint-box A by the revolving teeth. This movement of the cotton-seed through the basket is due to the fact that the fresh material is being constantly fed in at one end of said basket while the other is left entirely open. Hence no matter how slight the pressure at the receiving end may be, as the material will inevitably move in the direction of the lesser resistance, it follows that it will move toward the delivery end as it is revolved by the action of the cylinder.

Two baskets are shown; but a single one only may be used if preferred, or more than two may be used.

If desired, a cleaning brush or brushes may be used to discharge the lint from the teeth, said brush or brushes being arranged in the same manner as the saw cleaning or clearing brush of a cotton-gin.

We are aware that a cylinder having beveled or chisel-shaped teeth is not new, and do not claim such, broadly, as our invention.

We claim—

1. A basket, composed of sheet metal, having a concavity bent into the side thereof and slots cut through it at said concave portion, substantially as and for the purpose set forth.

2. The combination, with a basket having a concavity in the side thereof and slots cut through it at said concave portion, of a cylinder having teeth adapted to work in said slots, as set forth.

3. The combination, in a linting-machine, of a cylinder having teeth arranged thereon, and a basket having slots in which said teeth work, and rounded parts $b'$, substantially as and for the purpose set forth.

4. The combination, in a linting-machine, of a toothed cylinder, a basket having slots through which said teeth project, and a rounded part, $b'$, on the side to which the material is carried by the action of the teeth, substantially as set forth.

JULIUS J. KOCH.
WALTER P. GRATH.

Witnesses:
SAML. KNIGHT,
GEO. H. KNIGHT.